J. A. HART.
MEANS FOR PRODUCING AND UTILIZING ENERGIZED GASEOUS FLUID.
APPLICATION FILED JUNE 16, 1913.

1,131,512.

Patented Mar. 9, 1915.
3 SHEETS—SHEET 1.

Witnesses

Inventor
John Alston Hart,

UNITED STATES PATENT OFFICE.

JOHN ALSTON HART, OF BLACKBURN, ENGLAND.

MEANS FOR PRODUCING AND UTILIZING ENERGIZED GASEOUS FLUID.

1,131,512.  Specification of Letters Patent.  Patented Mar. 9, 1915.

Original application filed May 4, 1912, Serial No. 695,298. Divided and this application filed June 16, 1913.
Serial No. 774,024.

*To all whom it may concern:*

Be it known that I, JOHN ALSTON HART, a subject of the King of Great Britain, residing at Blackburn, in the county of Lancaster, in the Kingdom of England, have invented certain new and useful Improvements in and Connected with Means for Producing and Utilizing Energized Gaseous Fluid, of which the following is a specification.

This invention relates to means for producing and utilizing energized gaseous fluid. The energy may be manifested by pressure, temperature or velocity, or by two or more of these simultaneously.

The principal object of the invention is to deal with gaseous products of combustion, mixing them with air or other gas in such a way as to transfer energy from the products of combustion to the other gaseous body, producing a resultant body of gaseous fluid containing less energy per unit weight than the gaseous products of combustion.

A further object of the invention is to provide means for utilizing a part or the whole of the resultant body of gas.

A further object is the combination of an engine working expansively with elastic fluid with injector means and means for transferring a part of the charge from the engine to the injector means during the expansion, the injector means serving for imparting energy from the gaseous fluid taken from the engine to another body of gaseous fluid.

Other objects will be made evident by the further description of the invention which is given with reference to the accompanying drawings.

In these drawings.

Figs. 1 to 5 of the drawings correspond with Figs. 2, 3, 4, 11 and 12 respectively of the drawings of my co-pending application Serial No. 695298, filed May 4th, 1912.

Figure 1:
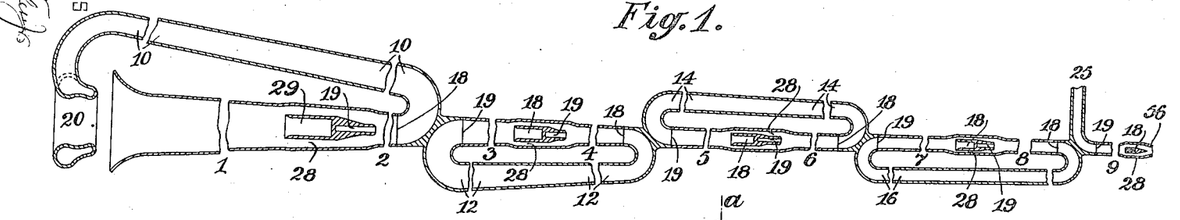
—Figure 1 is a longitudinal section, on the line *a—a* of Fig. 2, of injector means suitable for use in carrying out the present invention.

In the form of injector illustrated in Fig. 1 the initial driving stream of gas, having a relatively high value of energy per unit weight, enters by way of the passage 25 into the combining chamber 9. The initial driven stream enters the end of the other end stage indicated by the reference numeral 1. This stream is of relatively low energy contents per unit weight and in the arrangement illustrated is intended to be atmospheric air, although, of course, a gaseous body from another source could be taken in instead of atmospheric air. The body of gas resulting from the interaction of these two streams is delivered by the passage 56 beyond the end of the combining chamber 9 and as regards energy contents per unit weight is in a condition near to that of the initial driving stream, although its composition is different from that stream, since it combines parts of the initial driving and initial driven streams.

Figure 4:
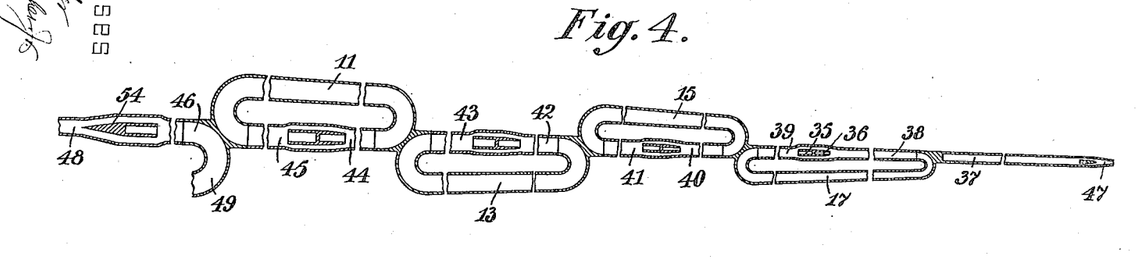
Figs. 4 and 5 are longitudinal sections, on planes at right angles to each other of another form.

In the form of injector illustrated in Fig. 4 the initial driving stream, as in the case just described, has relatively high energy contents per unit weight and the initial driven stream relatively low energy contents per unit weight, but the resulting body of gas in this case has a condition of energy per unit weight near to that of the initial driven stream. The initial driving stream enters by way of the passage 47 into one end stage. The initial driven stream enters by the side passage 49 at the other end stage and the resultant body of gaseous fluid leaves the injector apparatus by way of the passage 48.

Figure 6:
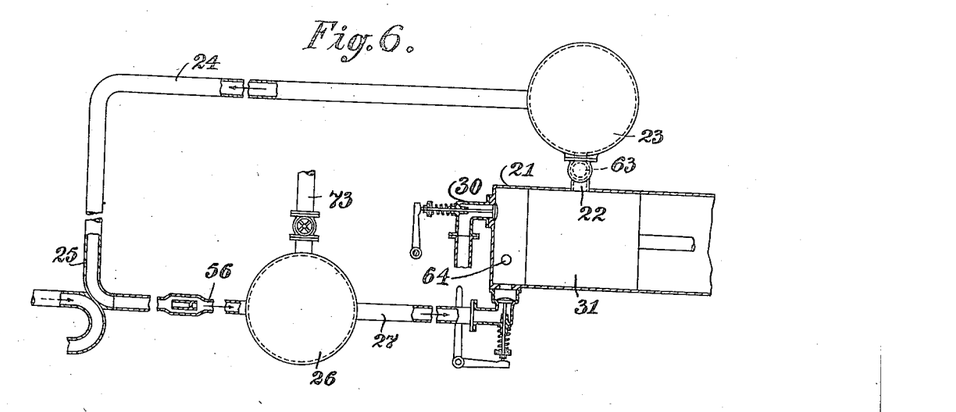
Figs. 6 and 7 are diagrams indicating the general arrangement of plant comprising the engine and the injector means, and certain accessories for use therewith.

In the arrangement illustrated in Fig. 6 an injector of the type shown in Fig. 1 is assumed to be employed, a portion of this injector being shown on Fig. 6. In the arrangement shown in Fig. 7, on the other hand, the type of injector illustrated in Fig. 4 is assumed to be employed and parts of this injector are shown on Fig. 7.

It is to be understood that in all of the figures the drawings are purely diagrammatic.

In Fig. 6, 21 indicates the cylinder of an internal combustion engine in which the piston 31 works. From this cylinder a pipe 22, provided with a non-return valve indicated by 63, leads to a receiver 23 so that at the desired stage in the cycle of the engine a portion of the charge can be withdrawn from the cylinder 21 to the receiver 23 and allowed to pass from there by way of the pipe 24 to the inlet pipe 25 of the injector apparatus illustrated in Fig. 1. The resultant gaseous body from this injector passes by way of the passage 56 to a receiver 26 which is connected by means of a pipe 27 with the head of the cylinder. 30 indicates the exhaust passage from the cylinder. The passages 30 and 27 are, of course, controlled by suitable valve gear which is indicated diagrammatically by mushroom valves and operating levers, it being understood that these are only given by way of example and that the general construction of valve gear suitable for the purpose in view is well known and does not require further illustration. The engine works on a two-stroke cycle as follows:—At the commencement of the working stroke communication between the passages 27 and the cylinder 21 is established so that the compressed charge enters and does work on the piston which moves outward. The fuel is either mixed with or taken up by the compressed charge before it reaches the cylinder or is sent separately into the space at the head of the cylinder and there mixed with the compressed charge. At the desired point in the stroke the mixture is ignited (an ignition device being indicated by 64) and the pressure rises above that of the compressed charge; the resulting gases are expanded continuing the work on the piston. When the desired point in the expansion has been reached communication between the cylinder 21 and passage 22 is established and a portion of the charge of the cylinder is then passed to the receiver 23. The stroke is then completed and the exhaust takes place during the return stroke. In the figure the piston 31 is seen to act as the valve member for opening the passage 22 and accordingly this passage is connected to a part of the cylinder wall which is covered and uncovered by the piston as it works. This passage 22 might, however, be connected to the head of the cylinder and separate valve gear provided for it. Compressed gas for use in other apparatus may be taken from the receiver 26 by way of pipe 73.

Figure 7:
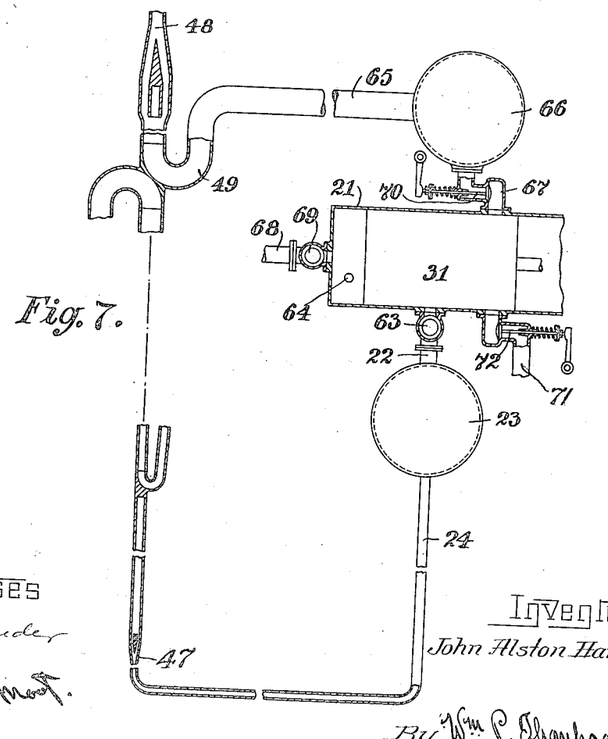

Instead of using an injector apparatus to compress the charge before it enters the cylinder, an injector apparatus may be connected to a receiver such as 23 for the initial driving gases and to a second receiver from which it removes gas so as to produce a vacuum. This receiver is then used to assist the exhausting, scavenging and charging arrangements of the engine by being put into connection with an outlet port in the cylinder and being caused to draw out products of combustion and draw scavenging air into and through the cylinder and a fresh charge into the cylinder. These operations preferably do not commence until after the opening of the ordinary exhaust valve has permitted a part of the products of combustion to flow out of the cylinder. They are completed at such a point in the cycle that the scavenging is completed and the cylinder re-charged so that the charge can be compressed during the return stroke of the piston. An arrangement such as just described is illustrated in Fig. 7, in which the parts corresponding to parts shown in Figs. 4 and 6 have the same reference numerals as used in those figures. In this arrangement the pipe 24 is connected with the passage 47 of the injector apparatus and the passage 49 of this apparatus is connected through a pipe 65 with a receiver 66 which is connected through a passage 67 and valve 70 with a port in the cylinder 21 which serves for the outflow of the exhaust gases when it is uncovered by the piston at the end of the expansion stroke and the valve 70 is opened. An exhaust passage 71, provided with a valve 72, is provided to take out part of the products of combustion so as to reduce the pressure in the cylinder to the neighborhood of atmospheric pressure. This valve 72 is opened prior to the valve 70 and is closed as this valve is opened. The discharge from the injector apparatus through the passage 48 will be at approximately atmospheric pressure and accordingly a partial vacuum will be produced in the passage 49 and receiver 66. Accordingly, when the pipe 66 is put in communication with the working space in the engine cylinder at the end of the expansion stroke, the outflow of the exhaust gases will be assisted and the inflow of scavenging air and a new charge of gas through the pipe 68 and valve 69 will be assisted. This use of the injector apparatus provides for more complete scavenging and recharging of the cylinder than is usually obtained with an ordinary two-stroke cycle engine.

Each of the injector apparatus illustrated consists of a long tubular member preferably of approximately rectangular cross-section. This member is divided into a series of chambers hereafter spoken of as combining chambers, the division being effected by the insertion of parts, the majority of which contain inlet and outlet passages arranged back to back. These passages lead to and from side pipes which lie approximately parallel with the main tubular member. Each side pipe is of approximately the length of two stages and is connected with the inlet and outlet members by curved portions which enter the main tubular member laterally and have their extreme end portions parallel with the walls of the main tubular member. A curved inlet member of one stage and a curved outlet member of the next stage are arranged back to back and have spaces at each side of them within the main tubular member, so that there is a clear passage from one combining chamber to the next past the inlet and outlet members.

In Fig. 1 the combining chambers of the different stages are indicated by the numerals 1 to 9 arranged in order. The side pipes would be numbered from 10 to 17 in order, but since these pipes are arranged in two sets in planes at right-angles to each other, it is only possible to show in this figure alternate side pipes indicated by the numbers 10, 12, 14 and 16, the other pipes being shown in Fig. 3. The outlets from the combining chambers to the side pipes are indicated by the numerals 18 and the inlets from the side pipes to the combining chambers are indicated by the numerals 19. The inlet 20 for the driving stream at the end of the combining chamber 1 is in the form of a perforated ring since it has to induce a flow of air in from the atmosphere. The lateral outlet 29 leading from the chamber 1 is not connected with a side pipe, but simply serves as an exhaust for the apparatus. It will be seen that outlets and inlets 18 and 19 leading to and from the side pipes extend completely across the main tubular member in one plane, but extend only part of the way across this member in the plane at right-angles to the first. Accordingly, there are spaces 28 at the sides of the members formed by the union of an outlet and an inlet part. At the outlet end of the chamber 9 there is arranged an outlet part 18 leading to a side pipe, but there is no corresponding inlet part 19 at the back of this outlet part. The member is simply tapered off. It will be seen that in the arrangement shown in Fig. 1 the course of flow of the gases in the combining chamber is from the lowest stage to the highest stage, that is, from the stage 1 in which the gas has the condition of lowest energy per unit weight to the stage 9 in which it has the condition of highest energy per unit weight. It will also be seen that in this arrangement the driving stream for each stage entering by way of the inlet part 19 has a driven stream at each side of it. The operation of this form of the apparatus is as follows: The initial driving stream enters by the nozzle 19 at the right hand end of the apparatus as previously indicated. Adjacent to this nozzle is a body of gas resulting from the actions in the previous stages of the apparatus, which body of gas acts as the driven stream and receives energy from the entering stream. A portion of the resulting gas enters the passage 18 at the right hand end of the apparatus and passes to the side pipe 17. The remainder of the combined stream passes to the outlet 56 beyond the end of the chamber 9. The portion of gas which flows through the side pipe 17 flows into the left hand end of the chamber 8 and there acts as the driving stream in that stage, acting upon the driven stream which has resulted from the action in the preceding chamber indicated by 7. A part of the combined stream from chamber 8 passes by way of the passage 18 at the right hand end of that chamber to the side pipe 16 and is carried back by this pipe to act as the driving stream in chamber 7. A similar action takes place in each of the lower stages until chamber 1 is reached. In this chamber the gas entering from the outside source, for instance from the atmosphere, is acted upon by a nozzle illustrated as of ring form and numbered 20. The combined stream of gas flows through chamber 1 in which a passage such as 29 may be provided to carry a portion of the stream of gas to the exhaust.

Figure 5:
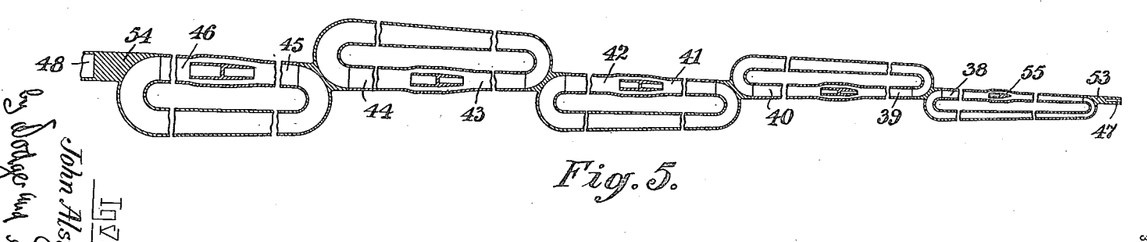

The actual construction of the arrangement shown in Figs. 4 and 5 is very similar to that shown in Fig. 1, but the action of the apparatus is different, the general course of the gas in the main tubular member being from the highest stage to the lowest stage and the driving stream for each stage being sent into the combining chamber in such a way as to lie on each side of the driven stream. In each apparatus the stream in a combining chamber is divided into two parts at the outlet, one part being led straight on to the next stage and the other part being led into a side pipe and carried by it back to the preceding stage.

Figure 2:
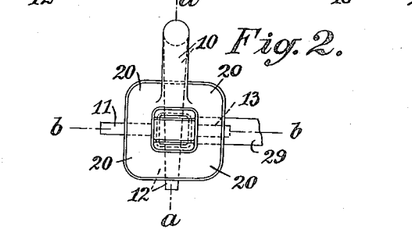
Fig. 2 is an end elevation of said means.
Figure 3:
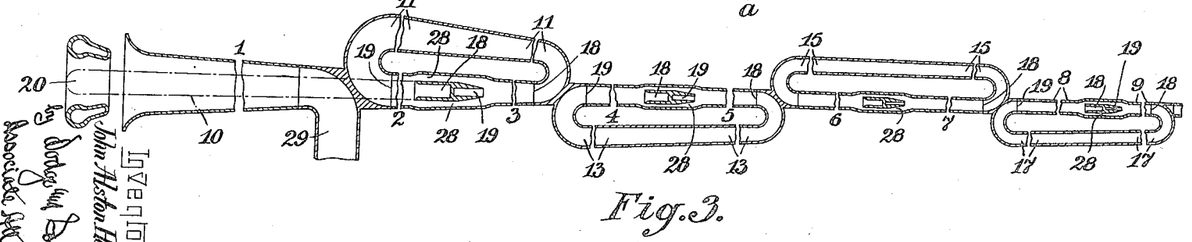
Fig. 3 is a longitudinal section, on the line *b—b* of Fig. 2.

In the arrangement shown in Fig. 2 the outlet passages from the combining chambers to the side pipes are indicated by the reference numerals 36 and the inlet passages by the reference numerals 35. The combining chambers are indicated by the numerals 37 to 46 in order. This form of apparatus works as follows:—The passage 49 provides for the inflow of gas to the combining chamber 46, this stream of gas being acted upon by a driving stream which raises its condition as regards energy per unit weight as the combined stream passes through the chamber. At the other end of this chamber 46 a portion of the gas passes through an outlet passage to the side pipe, which conducts it to the right hand end of the combining chamber 45 of the next higher stage, while the remainder of the combined stream from chamber 46 flows past the outlet passage to a discharge pipe 48. The portion of the gas from chamber 46 which is conducted by the side pipe to chamber 45 is there acted upon by a driving stream and a part of the combined streams passes to chamber 46 to act as the driven stream, while the remainder is conducted by a side pipe to the right hand end of combining chamber 44. A similar action takes place in the other stages. It will be seen that a portion of the gas taken out from chamber 46 to the side pipe and thence to chamber 45 is directly returned from the latter chamber to the former. A further part proceeds to higher stages some being directly returned to each stage from the adjacent higher stage so that the quantity of gas in each stage of the apparatus diminishes as we pass from left to right. The members 53, 54 and 55 located near the two ends of the apparatus only contain a single passage, this being an inlet passage in the case of members 53 and 55, and an outlet passage in the case of the member 54. The opposite ends of these members are tapered off so as to reduce the disturbance of the regular flow of the gases past them.

For each form of the multi-stage injector apparatus illustrated, in order to conduce to efficiency of working in the transfer of energy between the driving and driven streams in the stages, these streams are led into, through and out of the combining chambers in directions which lie side by side and are approximately parallel with the axes of the respective combining chambers, whereby impact action due to the flow of the streams in intersecting paths is avoided as far as possible.

The type of injector which is used for an arrangement of the kind described in connection with Fig. 7 may be either that shown in Fig. 1 or that shown in Fig. 4. As previously indicated, Fig. 7 actually shows the application of the type illustrated in Fig. 4. In using the type shown in Fig. 1 the chamber 1 is put in connection with the interior of the receiver 66. The exhaust passage 29 may be omitted in this case.

The subject-matter of this application forms a division of the subject-matter of my co-pending application Serial No. 695298, filed May 4th 1912.

I declare that what I claim is:—

1. Means for producing energized gaseous fluid, comprising an engine receiving elastic fluid and working with expansion of said fluid, means for taking out a portion of the said fluid from the engine during expansion, injector means for transferring energy from the said portion to another body of gaseous fluid, and means for utilizing the action of said injector means in producing the flow of a gaseous body into the working space of the engine.

2. Means for producing energized gaseous fluid, comprising an engine receiving elastic fluid and working with expansion of said fluid, means for taking out a portion of the said fluid from the engine during expansion, means for limiting the range of pressure during which the said portion is taken out from the engine, injector means for transferring energy from the said portion to another body of gaseous fluid, and means for utilizing the action of said injector means in producing the flow of a gaseous body into the working space of the engine.

3. Means for producing energized gaseous fluid, comprising an engine receiving elastic fluid and working with expansion of said fluid, means for taking out a portion of the said fluid from the injector during expansion, a receiver for the fluid taken out from the engine, injector means connected with said receiver for transferring energy from the fluid supplied by the receiver to another body of gaseous fluid, and means for utilizing the action of said injector means in producing the flow of a gaseous body into the working space of the engine.

4. Means for producing energized gaseous fluid, comprising an engine receiving elastic fluid and working with expansion of said fluid, means for taking out a portion of the said fluid from the engine during expansion, means for limiting the range of pressure during which the said portion is taken out from the engine, a receiver for the fluid taken out from the engine, injector means connected with said receiver for transferring energy from the fluid supplied by the receiver, to another body of gaseous fluid, and means for utilizing the action of said injector means in producing the flow of a gaseous body into the working space of the engine.

5. Means for producing energized gaseous fluid, comprising an engine receiving elastic fluid and working with expansion of said fluid, means for taking out a portion of the said fluid from the engine during expansion, a receiver for the fluid taken out from the engine, injector means connected with said receiver for transferring energy from the fluid supplied by the receiver, to another body of gaseous fluid, a second receiver connected with the injector means, and means for putting this second receiver in communication with the working space of the engine.

6. Means for producing energized gaseous fluid, comprising a cylinder, a piston working in said cylinder, a port in said cylinder, means for uncovering said port at a predetermined point in the piston stroke, a passage member connected with said port, injector means connected with said passage member and serving for transferring energy from the elastic fluid led out through said port to another body of gaseous fluid, means for closing the passage member when the pressure fall below a predetermined value, and means for utilizing the action of said injector means in producing the flow of a gaseous body into the cylinder.

7. Means for producing energized gaseous fluid, comprising a cylinder, a piston working in said cylinder, a port in said cylinder, means for uncovering said port at a predetermined point in the piston stroke, a passage member connected with said port, a receiver connected with said passage member, means for closing the passage member when the pressure in the cylinder falls below a predetermined value, injector means connected with said receiver and serving for transferring energy from the gaseous fluid taken out through the passage member to another body of gaseous fluid, and means for utilizing the action of said injector means in producing the flow of a gaseous body into the cylinder.

8. Means for producing energized gaseous fluid, comprising a cylinder, a piston working in said cylinder, a port in said cylinder, means for uncovering said port at a predetermined point in the piston stroke, a passage member connected with said port, a receiver connected with said passage member, means for closing the passage member when the pressure in the cylinder falls below a predetermined value, injector means connected with said receiver and serving for transferring energy from the gaseous fluid taken out through the passage member to another body of gaseous fluid, a second receiver connected with said injector means and means for putting said second receiver in communication with the interior of the cylinder.

9. Means for producing energized gaseous fluid, comprising a cylinder, a piston working in said cylinder, a port in said cylinder, means for uncovering said port at a predetermined point in the piston stroke, a passage member connected with said port, a receiver connected with said passage member, means for closing the passage member when the pressure in the cylinder falls below a predetermined value, injector means connected with said receiver and serving for transferring energy from the gaseous fluid taken out through the passage member to another body of gaseous fluid, a second receiver connected with said injector means, means connecting said second receiver with the head of the cylinder, and a valve controlling said connecting means.

10. Means for producing energized gaseous fluid, comprising an engine receiving elastic fluid and working with expansion of said fluid, means for taking out a portion of the said fluid from the engine during expansion, injector means for transferring energy from the said portion to another body of gaseous fluid, means for leading gas resulting from the action of the injector means to the working space of said engine, and a valve controlling said means.

11. Means for producing energized gaseous fluid, comprising an engine receiving elastic fluid and working with expansion of said fluid, means for taking out a portion of the said fluid from the engine during expansion, means for limiting the range of pressure during which the said portion is taken out from the engine, injector means for transferring energy from the said portion to another body of gaseous fluid, means for leading gas resulting from the action of the injector means to the working space of said engine, and a valve controlling said means.

12. Means for producing energized gaseous fluid, comprising an internal combustion engine, means for taking out a portion of the ignited charge from the working space of said engine during expansion, injector means for transferring energy from the said portion to another body of gaseous fluid, taken from the atmosphere, and means for leading gas resulting from the injector action to the working space of the said engine.

13. Means for producing energized gaseous fluid, comprising an internal combustion engine, means for taking out a portion of the ignited charge from the working space of said engine during expansion, injector means for transferring energy from the said portion to another body of gaseous fluid taken from the atmosphere, a receiver connected with the injector means, and receiving the gas resulting from the injector action, means for leading gas from said receiver to the working space of the said engine.

14. Means for producing energized gaseous fluid comprising an engine receiving elastic fluid and working with expansion of said fluid, means for taking out from the engine a portion of said fluid from the engine during expansion, injector apparatus connected with the taking out means and receiving said portion, said apparatus comprising a plurality of stages arranged in series and each having a combining chamber, inlet means for the driving stream of gas, inlet means for the driven stream of gas, the inlets and the chamber walls acting as means for causing the streams to flow side by side in directions which lie parallel with each other into and in the chamber, and outlet means for dividing the gas as it leaves the combining chamber into two parts and carrying these to different stages.

15. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages each having a combining chamber, means for causing a plurality of gas streams to flow side by side into the combining chamber in directions which lie parallel with each other, and outlet means for dividing the gas as it leaves the combining chamber into two parts and carrying them to different stages.

16. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages each having a combining chamber, inlet means for the driving stream of gas, inlet means for the driven stream of gas, means for guiding the streams in the chamber in directions which lie side by side without intersection, and outlet means for dividing the gas as it leaves the combining chamber into two parts and leading them to different stages.

17. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages, each having a combining chamber, inlet passages for the driving and driven streams and outlet means for the body of gas resulting from the action in the stage, one of said stages having, in connection with the said outlet means, means for dividing the body of gas into two parts and means for conveying one of said parts to an inlet means of another stage, the parts of the said dividing means which lie adjacent the points at which the gas first encounters the said means having their surfaces parallel with the direction of flow in the chamber adjacent these points.

18. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages, each having a combining chamber, inlet passages for the driving and driven streams and outlet means for the body of gas resulting from the action in the stage, one of said stages having the outlet means formed of a plurality of passages which have their walls, adjacent the points at which gas enters the passages, parallel with the direction of the gas flow in the chamber adjacent these points, one of the passages being curved laterally beyond the point at which the gas enters, a further passage member connected with said laterally curved part and means for connecting said passage member with the inlet means of one of the stages.

19. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages, each having a combining chamber, inlet passages for the driving and driven streams and outlet means for the body of gas resulting from the action in the stage, one of the stages having the walls of the inlet passages and the chamber forming means for guiding the streams into and through the chamber in directions which lie side by side without intersection, the said stage also having, in connection with the outlet means, means for dividing the gaseous body coming from the chamber into two parts and for leading them to different destinations.

20. Means for producing energized gaseous fluid comprising an engine receiving elastic fluid and working with expansion of said fluid, means for taking out from the engine a portion of said fluid from the engine during expansion, injector apparatus connected with the taking-out means, and receiving said portion, said apparatus comprising a plurality of stages each having a combining chamber, inlet means for the driving stream of gas, inlet means for the driven stream of gas, means for guiding the streams in the chamber in directions which lie side by side without intersection, means for leading part of the gas from the combining chamber forward directly into the inlet means of the next stage, and means for leading another part of the gas back to the inlet means of another stage, one of the parts of the gas serving as the driving stream and the other as the driven stream in the stages into which they are led.

21. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages each having a combining chamber, inlet means for leading driving and driven streams of gas into said chamber, outlet means for dividing the gas leaving the combining chamber into two parts and leading them to different destinations, said outlet means having their walls adjacent the points at which the gas enters them parallel with the direction of the gas flow in the chamber adjacent these points.

22. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages arranged in series and each having a combining chamber, side pipes adjacent said chamber, inlet means for leading driving and driven streams of gas into said chamber and outlet means leading the gas from said chamber in two portions, a curved passage joining one of said side pipes to one of said inlet means, a curved passage joining the other of said side pipes to one of said outlet means, one of the inlet means and one of the outlet means being formed by end portions connecting said curved passages with said chamber and having their walls directed parallel with the directions of gas flow in the adjacent parts of the chamber.

23. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages arranged in series and each having a combining chamber, side pipes adjacent said chamber, inlet means for leading driving and driven streams of gas into said chamber and outlet means leading the gas from said chamber in two portions, a laterally extending passage joining one of said outlets to one of said side pipes, a second laterally extending passage joining one of said inlets with the other of said side pipes, the lateral inlet connecting passage of one stage and the lateral outlet connecting passage of the next stage being arranged back to back.

24. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages arranged in series and each having a combining chamber, side pipes adjacent said chamber, inlet means for leading driving and driven streams of gas into said chamber and outlet means leading the gas from said chamber in two portions, a laterally extending passage joining one of said outlets to one of said side pipes, a second laterally extending portion joining one of said inlets with the other of said side pipes, the lateral inlet connecting passage of one stage and the lateral outlet connecting passage of the next stage being arranged back to back, the walls of said passages being shaped so as to unite to produce a continuous body without abrupt recesses or projections to disadvantageously affect the flow of gas past them from one stage to the next.

25. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages arranged in series and each having a combining chamber, inlet means for leading driving and driven streams of gas into said chamber, outlet means leading the gas from said chamber in two portions, a laterally extending passage connected with one of said outlets, a second laterally extending passage connected with one of said inlets, the lateral inlet passage of one stage and the lateral outlet passage of the next stage being arranged back to back.

26. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising two stages arranged in series and each having a combining chamber and inlet and outlet passages, an outlet passage of the first stage being laterally directed and an inlet passage for the second stage being also laterally directed, the portions of these passages which lie adjacent the junction of the two stages being arranged back to back.

27. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages each having a combining chamber, inlet means for leading driving and driven streams of gas into said chamber, outlet means for dividing the gas leaving the combining chamber into two parts and leading them to different stages, said outlet means having their walls adjacent the points at which the gas enters them substantially parallel with the axis of the combining chamber.

28. Means for producing energized gaseous fluid comprising an engine receiving elastic fluid and working with expansion of said fluid, means for taking out from the engine a portion of said fluid from the engine during expansion, injector apparatus connected with the taking-out means and receiving said portion, said apparatus comprising a plurality of stages arranged in series, an inlet for a stream of gas in a condition of relatively high energy per unit weight at one end stage, and an inlet for a stream of gas of relatively low energy contents per unit weight at the other end stage, an outlet for a gaseous stream resulting from the action of the apparatus; stages between the two end ones each having a combining chamber, inlet means for the driving stream of gas, inlet means for the driven stream of gas, the inlets and the chamber walls acting as means for causing the streams to flow side by side in directions which lie parallel with each other into and in the chamber, and outlet means for driving the gas as it leaves the combining chamber into two parts and carrying these to different stages.

29. A cycle of operation of an internal combustion engine, consisting in burning a charge of compressed gas in a cylinder of an engine, allowing the said charge and the products of its combustion to expand in the cylinder and thereby perform work, taking a part of said products out of the cylinder before the end of the expansion is reached, utilizing said part as the source of energy for compressing a further charge of gas, exhausting the remainder of the products of combustion after completion of the expansion in the cylinder, admitting to the cylinder a charge of compressed gas prepared in the manner indicated.

30. A cycle of operation of an internal combustion engine consisting in admitting a charge of compressed gas to a cylinder of an engine during the first part of a stroke of the piston, igniting said charge and allowing it and the products of its combustion to expand and thereby perform work upon the piston, taking out a portion of the products of combustion from the cylinder during the expansion and utilizing said portion as the source of energy for compressing a further charge of gas to be used in a later cycle, exhausting the remainder of the products of combustion on the completion of the expansion in the cylinder.

31. A cycle of operation of an internal combustion engine consisting in admitting a charge of compressed gas from a receiver into a cylinder of an engine, igniting the charge, and allowing the products of combustion to expand, taking a portion of said products from the cylinder before the end of the expansion, utilizing said portion for injecting gas into a receiver, exhausting the remainder of the products of combustion after completion of the expansion in the cylinder.

32. A continuous method of producing energized gaseous fluid consisting in the repeated performance of the following cycle of operation;—igniting a compressed charge of gas, allowing said charge to expand while performing mechanical work, removing a portion of said charge from the main body in the earlier part of the expansion, leading said portion into contact with a second body of gas so as to impart compression thereto, utilizing the compressed gaseous body thus produced as the charge for ignition for the commencement of a further cycle.

In witness whereof, I have hereunto signed my name this 2nd day of June 1913, in the presence of two subscribing witnesses.

JOHN ALSTON HART.

Witnesses:
JOHN HAYHURST,
FRANCIS GILLETT.